Jan. 12, 1960 G. E. LUND 2,921,297

SHIFT CODE COUNTER

Filed Aug. 19, 1958 2 Sheets-Sheet 1

INVENTOR.
GEORGE E. LUND

BY
Francis A. Varallo
AGENT

Jan. 12, 1960 | G. E. LUND | 2,921,297

SHIFT CODE COUNTER

Filed Aug. 19, 1958 | 2 Sheets-Sheet 2

| CLOCK CYCLES | | MAGNETIC CORES: 10A | 10A' | 10B | 11A | 11B | 12A | 12B | 12B' | 13A | 13B |
|---|---|---|---|---|---|---|---|---|---|---|---|
| PRESET | $t_1, b_1$ | 0 | 0 | 0 | 1 | 0 | 0 | 0 | 0 | 0 | 0 |
| | $t_2$ | 0 | 0 | 0 | 0 | 1 | 0 | 0 | 0 | 0 | 0 |
| 1 | $t_1$ | 0 | 0 | 0 | 0 | 0 | 1 | 0 | 0 | 0 | 0 |
| | $t_2$ | 0 | 0 | 0 | 0 | 0 | 0 | 1 | 1 | 0 | 0 |
| 2 | $t_1$ | 0 | 1 | 0 | 0 | 0 | 0 | 0 | 0 | 1 | 0 |
| | $t_2$ | 0 | 0 | 1 | 0 | 0 | 0 | 0 | 0 | 0 | 1 |
| 3 | $t_1$ | 1 | 0 | 0 | 1 | 0 | 0 | 0 | 0 | 0 | 0 |
| | $t_2$ | 0 | 0 | 1 | 0 | 1 | 0 | 0 | 0 | 0 | 0 |
| 4 | $t_1$ | 0 | 0 | 0 | 1 | 0 | 1 | 0 | 0 | 0 | 0 |
| | $t_2$ | 0 | 0 | 0 | 0 | 1 | 0 | 1 | 1 | 0 | 0 |
| 5 | $t_1$ | 0 | 1 | 0 | 0 | 0 | 1 | 0 | 0 | 1 | 0 |
| | $t_2$ | 0 | 0 | 1 | 0 | 0 | 0 | 1 | 1 | 0 | 1 |
| 6 | $t_1$ | 0 | 0 | 0 | 1 | 0 | 0 | 0 | 0 | 1 | 0 |
| | $t_2$ | 0 | 0 | 0 | 0 | 1 | 0 | 0 | 0 | 0 | 1 |
| 7 | $t_1$ | 1 | 0 | 0 | 0 | 0 | 1 | 0 | 0 | 0 | 0 |
| | $t_2$ | 0 | 0 | 1 | 0 | 0 | 0 | 1 | 1 | 0 | 0 |
| 8 | $t_1$ | 0 | 1 | 0 | 1 | 0 | 0 | 0 | 0 | 1 | 0 |
| | $t_2$ | 0 | 0 | 1 | 0 | 1 | 0 | 0 | 0 | 0 | 1 |
| 9 | $t_1$ | 1 | 0 | 0 | 1 | 0 | 1 | 0 | 0 | 0 | 0 |
| | $t_2$ | 0 | 0 | 1 | 0 | 1 | 0 | 1 | 1 | 0 | 0 |
| 10 | $t_1$ | 0 | 1 | 0 | 1 | 0 | 1 | 0 | 0 | 1 | 0 |
| | $t_2$ | 0 | 0 | 1 | 0 | 1 | 0 | 1 | 1 | 0 | 1 |
| 11 | $t_1$ | 0 | 0 | 0 | 1 | 0 | 1 | 0 | 0 | 1 | 0 |
| | $t_2$ | 0 | 0 | 0 | 0 | 1 | 0 | 1 | 1 | 0 | 1 |
| 12 | $t_1$ | 0 | 0 | 0 | 0 | 0 | 1 | 0 | 0 | 1 | 0 |
| | $t_2$ | 0 | 0 | 0 | 0 | 0 | 0 | 1 | 1 | 0 | 1 |
| 13 | $t_1$ | 0 | 0 | 0 | 0 | 0 | 0 | 0 | 0 | 1 | 0 |
| | $t_2$ | 0 | 0 | 0 | 0 | 0 | 0 | 0 | 0 | 0 | 1 |
| 14 | $t_1$ | 1 | 0 | 0 | 0 | 0 | 0 | 0 | 0 | 0 | 0 |
| | $t_2$ | 0 | 0 | 1 | 0 | 0 | 0 | 0 | 0 | 0 | 0 |
| 15 | $t_1$ | 0 | 0 | 0 | 1 | 0 | 0 | 0 | 0 | 0 | 0 |

INVENTOR.
GEORGE E. LUND
BY
Francis A. Varallo
AGENT

United States Patent Office 2,921,297

Patented Jan. 12, 1960

2,921,297

SHIFT CODE COUNTER

George E. Lund, Havertown, Pa., assignor to Burroughs Corporation, Detroit, Mich., a corporation of Michigan Application August 19, 1958, Serial No. 755,917

6 Claims. (Cl. 340—174)

This invention relates to electronic counting circuits and more particularly to counters which employ bistable magnetic storage elements in a novel and efficient manner.

Shift registers employing magnetic elements for the storage of binary information are well known in the art, as evidenced by articles such as "An Electronic Digital Computer," written by A. D. Booth, and published in Electronic Engineering for December 1950. A variety of counting circuits have been devised using magnetic storage elements in accordance with the shift register principles disclosed in said article.

In a magnetic serial shift register the stored information must be read out of one element before a further bit of information can be stored therein. Therefore a delay is required in shifting the stored signal from one magnetic element to the next. This delay may be realized by inserting a temporary storage element as an idler core between two storage elements. This principle is employed in a known counter circuit where, in order to count the number N, N pairs of magnetic elements are connected in a ring. The output from the last stage of the shift register is fed back to the first stage. Each pair of elements includes a count element and an intermediate storage element. Count signals and shift pulses are applied alternately to the count elements and intermediate storage elements respectively, to advance a single reference bit of information along the ring. An output pulse is available from a selected count element every Nth count signal.

Conventional counter circuits constructed as hereinbefore described, are inefficient and uneconomical for relatively large count-downs because of the number of magnetic elements required. If it is desired to increase the count from N to twice N, it is necessary to double the number of pairs of magnetic elements already in the counter. As will become apparent from the description of the instant invention which follows, the count may be doubled by adding one stage to the counter, or a maximum of two storage elements.

This invention relates to a counter circuit in which the outputs from a plurality of storage elements in a serial shift register are delivered to the input stages of a modifying logical circuit whose output is subsequently fed back to the input stage of the register.

The shift code counter of the instant invention comprises a serial shift register, a circuit for the logical combination of the parallel outputs of several of the shift register stages which is then fed back to the serial input, and a circuit for sensing the state of the register and giving an output when a unique information content is found therein. The information content of the register changes with every clock cycle and the device counts by the use of a sequence of non-consecutive numbers.

An important feature of the shift code counter is that it counts at the clock rate. For this reason it is faster than either binary counters which must allow a carry pulse to be propagated, or subtract counters which must cycle the number being used to count until it returns to its standard position. Another significant advantage of the shift code counter is that it uses fewer components than other types of counters in all cases except where the count is very small.

In accordance with the instant invention, if the outputs from selected stages of the shift register are subjected to certain combining functions, the counter will complete a cycle in $(2^N-1)$ shifts, where N is the number of stages of the register. This means that if a binary number is preset in the register, and the proper output stages and modifying logic circuit are employed, the information content of the register will change in a non-consecutive manner with each shift pulse applied to the cores of the register. This action continues until the $(2^N-1)$th shift pulse following said presetting returns the register to its preset pattern. Thus, if a single binary "1" has been preset in the register, the sensing circuit hereinbefore mentioned might be adapted to deliver an output signal to a utilization device only when the particular "all '0' but one" pattern appears in the register. Additional circuit flexibility may be gained by allowing the sense output signal to preset any desired pattern in the shift register for determining the next count.

It is a general object of the present invention to provide an improved counter circuit utilizing bistable magnetic storage elements.

A more specific object of this invention is to provide a high speed counter circuit which counts at the clock repetition rate.

Another object of the invention is to provide a counter for producing large count-downs which is economical with respect to the number of storage elements employed therein.

A further object of this invention is to provide a counter circuit in which the binary number preset therein changes with every clock cycle, and the count cycle comprises a sequence of non-consecutive numbers.

Other features and objects of the invention will be described throughout the following detailed description of the invention, and illustrated in the accompanying drawings, in which.

Before proceeding with a detailed analysis of the circuit, it will be helpful to review the notation and background material used in connection with the schematic diagram. Information of opposite polarities to be stored in the binary elements is arbitrarily designated in the binary notation "1" and "0." Magnetic binary elements are shown as circles and it is assumed that these circles represent magnetic cores having essentially rectangular hysteresis loop characteristics. Although the magnetic elements are depicted herein as being toroidal in form, it is understood that the invention is not limited to elements of this particular geometry, but may include other forms of magnetic storage elements.

Each of the magnetic cores is supplied with windings for producing a magnetic flux therein in response to current flow through these windings. A dot is placed at the end of each of these windings to indicate that the end has a negative polarity during read-in of a binary "1." Thus as current flows into the dotted winding terminal the core associated with such winding will tend to store a "0." Conversely, if current flows into an undotted winding terminal, the core associated with such winding will tend to store a "1." The windings coupled to the magnetic cores of Fig. 1 have been depicted with one, two and three turns in order to distinguish their function as input, advance or interrogation, and output respectively.

The signal, storage conditions and currents are designated by appropriate letters supplied with subscript numbers which designate a relative time step. Conditional pulses are represented by letters "*a, b, c*," etc. The time at which these pulses occur in a cycle is indicated by a subscript, the sequence in time corresponding to the sequence of the subscript. Unconditional pulses are represented by the letter "*t*," followed by a subscript representing the time indication.

Figure 1:
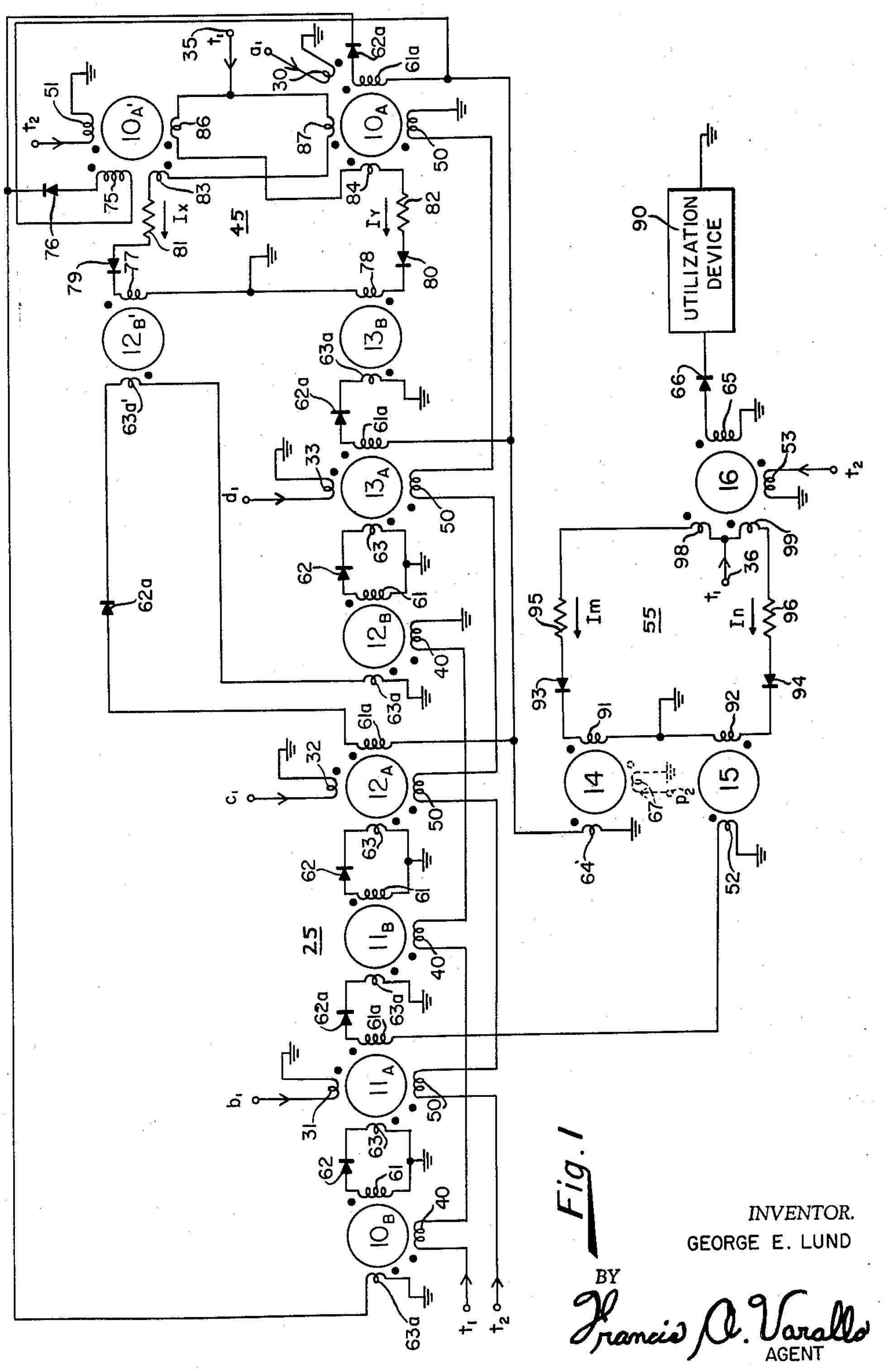
Fig. 1 is a schematic diagram illustrating an embodiment of the instant counter circuit.

Referring to Fig. 1, magnetic cores 10A–B through 13A–B inclusive, and their associated transfer circuits comprise a 4-stage re-entrant shift register 25. Cores 10A and 10B comprise the "first" stage of the register; cores 13A and 13B, the "last" stage. Each of the B cores (those bearing the subscript B), with the exception of 13B, is coupled to the succeeding subscript A core by a transfer loop consisting of the series circuit arrangement of an output winding 61, diode 62, and an input winding 63. Cores 10A and 13A are coupled respectively to cores 10B and 13B by transfer circuits comprising the series arrangement of output winding **61*a*, diode 62*a*, input winding 63*a*, and a common winding 64 coupled to magnetic core 14. Core 11A is coupled to 11B by a transfer circuit comprising winding 52 on core 15, output winding 61*a*, diode 62*a*, and input winding 63*a*. Core 12A is coupled to both cores 12B' and 12B by a series transfer loop comprising winding 64 on core 14, output winding 61*a*, diode 62*a*, and input windings 63*a'* and 63*a***.

As hereinbefore mentioned, if the outputs from selected stages in the shift register are acted upon in accordance with certain logical functions, the counter will complete a cycle in $2^N-1$ shifts, where N is the number of stages of the register. Depending upon the count desired, a binary number is preset in the shift register by applying the proper combination of pulses *a', b', c'* and *d'* to input windings 30, 31, 32 and 33 coupled respectively to cores 10A, 11A, 12A and 13A. The maximum count available from any given circuit configuration will be approximately doubled by the addition of a single stage to the shift register, or a maximum of two storage elements and their associated transfer circuits. The B cores are used as idler cores for intermediate storage. The binary information stored in the A cores of the register is advanced to the B cores by current $t_2$ flowing through windings 50. Likewise advance current pulse $t_1$, flowing through windings 40, causes the information in the B cores to be transferred to the A cores.

Magnetic cores 13B and 10A have a dual function, namely, as storage cores of the shift register 25 and as part of the logical modifying circuit 45 in combination with magnetic cores 12B' and 10A'. Core 10A' is coupled to core 10B by a series circuit comprising winding 64 on core 14, output winding 75, diode 76 and input winding **63*a* on core 10B. It is to be noted that the outputs of cores 10A and 10A' are "OR"ed together by virtue of their common connection to winding 63*a* on core 10B. Cores 13B and 12B' are the input, and 10A and 10A' are the output cores of the logic circuit 45 which performs the double inhibit or Exclusive-OR function. The input logic circuit cores receive the output information from cores 12A and 13A situated in the third and fourth (last) stages of the register 25, respectively. The Exclusive-OR circuit 45 is described and claimed in co-pending application of Albert J. Meyerhoff, Serial No. 759,775, filed September 8, 1958, which is a division of application Serial No. 479,061, now Patent No. 2,861,259, filed December 31, 1954, in the name of Albert J. Meyerhoff, both of which have been assigned to the same assignee as the instant application. Briefly, the presence of a binary "1" in core 12B' when current pulse $t_1$ is applied to terminal 35, will inhibit the transfer of a binary "1" from core 13B to core 10A; similarly the presence of a "1" in core 13B will inhibit the transfer of a "1" from core 12B' to 10A'. The operation of the logic circuit will become apparent in the detailed description of the counter circuit which follows. Windings 77 and 78 are interrogation windings coupled to cores 12B' and 13B respectively. Cores 10A and 10A' each have a pair of input windings 84, 87 and 83, 86, coupled respectively thereto. Diodes 79 and 80 prevent the flow of current around the modifying loop when information is read into cores 13B and 12B'. Resistors 81 and 82 serve to compensate for slight differences in static circuit impedance which may exist between the upper and lower halves of the circuit 45**.

The binary number circulating in the shift register at a particular time may be sensed by logical configurations of magnetic cores coupled to the shift register stages in various combinations. In the schematic of Fig. 1 magnetic cores 14, 15 and 16, and their associated components, form a logical inhibit circuit 55 adapted to supply an output pulse to the utilization device 90 when, and only when, the binary number in the register is "0 1 0 0," i.e., when core 11A is in the "1" state and all the other shift register cores are in the "0" state. Said inhibit circuit is described and claimed in the aforementioned co-pending application Serial No. 479,061, now Patent No. 2,861,259. Cores 14 and 15 are input cores, and core 16 is an output core of the inhibit circuit. An output pulse is stored in core 16 whenever core 14 is in the "0" state, and core 15 is in the "1" state at the time interrogation pulse $t_1$ is applied to terminal 36 of the sensing circuit. As hereinbefore mentioned, input winding 64 coupled to magnetic core 14 is connected in common to all of the shift register transfer loop circuits which couple the A and A' cores to the B cores, with the exception of the transfer loop between 11A and 11B. The transfer of a binary "1" by advance pulse $t_1$ from said latter mentioned A and A' cores to the B cores, also stores a "1" in core 14. Core 15 is driven to the "1" magnetic remanent state in response to the current flowing through winding 52 as a result of the switching of core 11A from the "1" state to the "0" state. The operation of the inhibit circuit 55 will hereinafter be explained in greater detail in connection with the overall counter operation. Interrogation windings 91 and 92 are coupled to cores 14 and 15 respectively. Coupled to output core 16 are two input windings 98 and 99, an interrogation winding 53 and an output winding 65. Diodes 93 and 94 prevent the circulation of current in the sensing loop during the read-in of signals into cores 14 and 15. Resistors 95 and 96 tend to compensate for any minor unbalance in the static impedances of the upper and lower halves of the sensing loop. Diode 66 is connected in series with the output winding 65 and the utilization device 90 to prevent the flow of current to the utilization device except during the switching of magnetic core 16 from the "1" state to the "0" state.

Figures 2, 3:
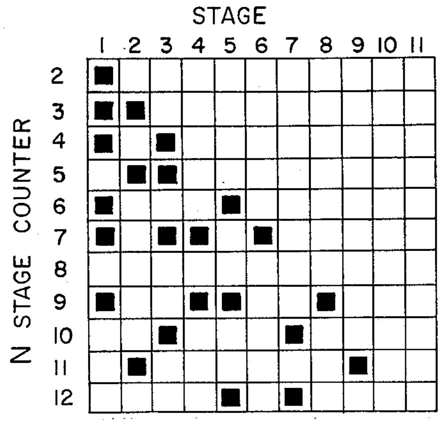
Fig. 2 depicts in tabular form the magnetic remanent states of the cores in the shift register and modifying logic circuit portions of the shift code counter for each time step in a complete count cycle.
Fig. 3 is a table for various N stage counters, illustrating which of the stages, in addition to the last, may be combined in the logical circuit to give a complete count cycle.

The operation of the 4-stage counter circuit of Fig. 1 will be illustrated with the aid of the table of Fig. 2, which describes how a complete count cycle of fifteen is obtained. In Fig. 2, the magnetic remanent states of the cores 10A through 13B inclusive, listed in each row are those resulting from the application of the current pulse or pulses shown adjacent to said rows. The numbers 1 through 15, inclusive, represent clock cycles in a complete cycle for counting "fifteen." Each clock cycle consists of two time steps designated by subscript numbers. In the interest of clarity in the following description, the clock cycle designation will precede the pulse designation and time step subscript. For example, $2t_1$ represents the occurrence of an unconditional advance pulse "$t$" in the first step of the second clock cycle.

Initially all of the magnetic cores are assumed to be in the "0" remanent state. A binary "1" is preset in core 11A at a $t_1$ time. This is accomplished by causing current pulse $b_1$ to flow through winding 31 of core 11A, thereby switching said latter core to the "1" state. The absence of pulses $a_1$, $c_1$, and $d_1$ allows cores 10A, 12A and 13A to remain in their respective "0" states. In response to the first $t_2$ pulse following the presetting of the binary number in the register, core 11A will switch from the "1" state to the "0" state, thereby inducing a switching voltage in winding 61 coupled to said latter core and causing current to flow through input windings 52 and 63$a$ coupled to cores 15 and 11B respectively, thereby switching each of said latter cores from the "0" state to the "1" state. The following $1t_1$ pulse transfers the "1" from 11B to 12A via output winding 61 coupled to 11B, diode 62, and input winding 63 on 12A. Next, the $1t_2$ pulse will cause core 12A to switch from its "1" state to its "0" state, thereby inducing a switching voltage in winding 61 associated with core 12A and causing current to flow through the common input winding 64 coupled to core 14 and the input windings 63A′ and 63A coupled respectively to cores 12B′ and 12B, thereby switching cores 14, 12B′ and 12B from the "0" state to the "1" state. The function of winding 64 on core 14 and winding 52 on core 15 will hereinafter be considered in detail in connection with a description of the sensing circuit 55.

Thus, prior to the occurrence of the first advance pulse in the second clock cycle, cores 12B and 12B′ are in the "1" state, and the other shift register and logical circuit cores are in the "0" state. Current pulse $2t_1$ applied to terminal 35 of the logic circuit 45 divides unequally into a larger amplitude current $I_y$, and a smaller current $I_x$. This condition results from the impedance presented to current $I_x$ by the counter E.M.F. generated in winding 77 during the switching of core 12B′ from the "1" state to the "0" state. Core 13B already in the "0" state, offers only a slightly impedance to current $I_y$. Due to the unbalance in the branch currents, core 10A′ is switched from the "0" state to the "1" state by current $I_y$ flowing through winding 86, and core 10A is driven further into the "0" state. Current $2t_1$ also advances the information in the shift register so that at the termination of $2t_1$ pulse, core 13A is also in the "1" state. Subsequently, the $2t_2$ pulse applied to winding 51 of core 10A′ switches the latter core from the "1" state to the "0" state, thereby inducing a voltage in output winding 75 which produces current flow in a path comprising winding 64 of core 14, winding 75, diode 76, and input winding 63$a$ coupled to core 10B. Pulse $2t_2$ flowing through winding 50 also transfers the "1" from core 13A to core 13B.

Consequently, after the second clock cycle following the presetting of a binary "1" in the register 25, cores 10B and 13B are in the "1" state. Since core 13B is also an input core of the logic circuit, as hereinbefore mentioned, the transfer of a "1" from core 13B to 10A is accomplished through the action of the logic circuit 45. Interrogating current pulse $3t_1$ applied to terminal 35 of the logic circuit divides into branch currents $I_x$ and $I_y$ which flow through windings 77 and 78 respectively in such a direction as to switch each of the cores 12B′ and 13B from the "1" state to the "0" state. In the present case, the switching of core 13B from the "1" state to the "0" state provides a higher impedance to current $I_y$ than that which core 12B′, already in the "0" state, presents to current $I_x$. Consequently current $I_x$ is larger than current $I_y$. The switching M.M.F. applied to core 10A by current $I_x$ flowing through winding 87 is sufficient to overcome the effect of the smaller current $I_y$ flowing through winding 84, and core 10A is switched to the "1" state. Magnetic core 10A′, on the other hand, is driven further into the "0" state. The information in core 10A is subsequently transferred to core 10B in response to the application of current pulse $3t_2$ to winding 50.

In like manner, the information in the register will be advanced from core to core and continuously modified by the logic circuit 45 in response to alternate advance or interrogation pulses, $t_1$ and $t_2$.

Reference to the table of Fig. 2 indicates that at the termination of the $5t_2$ pulse, a binary "1" has been stored in each of the input cores, 13B and 12B′ of the logic circuit. In the next clock cycle, $6t_1$ pulse applied to terminal 35 of the modifying circuit 45 divides equally into branch currents $I_x$ and $I_y$ since both input cores are in the "1" state. These balanced currents allow cores 10A and 10A′ to remain in their respective "0" states. Likewise it should be noted that whenever both input cores 12B′ and 13B are in the "0" state at $t_1$ time, the same condition of balanced currents $I_x$ and $I_y$ prevails and the remanent states of cores 10A and 10A′ remain unchanged.

The circuit operation for all the clock cycles is similar to that previously described. It should be noted that the $t_1$ pulse of the fifteenth clock cycle returns the shift register to the same pattern as had been preset therein, i.e., all "0's" except a "1" in core 11A. In effect a count of fifteen has been completed, and it will be assumed that at this time some indication of the completed count cycle is desired. The sensing circuit 55 of Fig. 1 is adapted to give such an indication.

The $t_2$ pulse succeeding $15t_1$ switches core 11A from the "1" state to the "0" state and causes current to flow through winding 52 of core 15 in such a direction as to switch core 15 to the "1" state. Whenever one or more of the A and A′ cores of the shift register (with the exception of core 11A) are being switched from the "1" state to the "0" state by a $t_2$ pulse applied to windings 50 and 51, current flows into the undotted terminal of winding 64 of core 14 and then through the transfer loop circuits coupling said A and A′ cores to the succeeding B cores. In this manner core 14 is switched to the "1" state at a $t_2$ time. Since in the present situation there are all "0's" in said A and A′ cores at $t_2$ time, no current will flow through winding 64 when the latter cores are interrogated, and core 14 remains in the "0" state.

The presence of a binary "1" in core 14 at interrogation time $t_1$ will inhibit the transfer of a "1" stored in core 15 to the output core 16. Conversely, the absence of a binary "1" in core 14, and the presence of a "1" in core 15, results in the switching of core 16 to the "1" state. In the former case where both input cores 14 and 15 are in their respective "1" states, interrogating current $t_1$ applied to terminal 36 will divide equally into branch currents $I_m$ and $I_n$, since the switching impedances presented to the branch currents are substantially equal. The magnetomotive forces applied to core 16 by currents $I_m$ and $I_n$ flowing respectively through windings 98 and 99 are equal and opposite so that core 16 remains in the "0" remanent state. Another condition is frequently encountered during the counter operation, namely core 15 is in the "0" state and core 14 in the "1" state. In this case current $I_m$ will be impeded by the counter E.M.F. developed across winding 91 of core 14 and current $I_n$ will be substantially larger. Since $I_n$ enters the dotted terminal of winding 99 on core 16, the latter core will remain in the "0" state in the presence of the switching M.M.F. generated by current $I_m$ flowing through winding 98 on core 16. In the present situation where core 14 is in the "0" state, and core 15 in the "1" state at the $t_1$ time succeeding the fifteenth clock cycle, current $I_n$ will be impeded by the counter E.M.F. generated in winding 92 during the switching of core 15 to the "0" state, and current $I_m$ will be substantially larger than $I_n$. Current $I_m$ flowing through winding 98 switches core 16 to the "1" state. The succeeding $t_2$ pulse applied to winding 53 of core 16 switches core 16 to the "0" state, thereby developing an output voltage across winding 65. This output voltage is transferred via diode 66 to the utilization device 90. The winding 65 may be connected to the input windings of certain of the shift register cores as well as to the utilization device in order to reset the shift register cores in any predetermined pattern.

In accordance with the mode of operation of the sensing circuit 55, as hereinbefore described, and depending upon the information preset in the register, output core 16 may deliver a pulse to the utilization device during the $t_2$ time of the first clock cycle. This extraneous output pulse is desirable in some applications as a start indication. However, if the pulse is objectionable it can be eliminated by placing an additional input winding 67 on core 14 and allowing current pulse $p_2$ to preset a "1" in said latter core, simultaneously with the occurrence of the first $t_2$ pulse following the presetting of the information in the register.

The maximum count available from a shift code counter of N stages, constructed in the manner described herein, is $2^N-1$. Thus for the 4-stage counter depicted in Fig. 1, the maximum count is "fifteen." If a count smaller than the maximum is desired, it is easily obtained by presetting a first pattern in the shift register and sensing a second pattern whenever it occurs in the register. For example, consider the schematic of Fig. 1 and the sequence of non-consecutive binary numbers appearing in a complete cycle, as shown in Fig. 2. If, instead of presetting a "1" in core 11A and sensing the recurrence of the "1" in core 11A after the fifteenth shift pulse, a "1" had been preset in both cores 10A and 12A (the pattern appearing in the table of Fig. 2 for the $t_1$ pulse of the seventh clock cycle), an output from sensing circuit 55 would then indicate that a count of "eight" had been completed, that is, that the eight clock cycles necessary to modify the information in the register from the preset "1 0 1 0" to the sensed "0 1 0 0" had occurred.

As previously mentioned, in order to achieve a complete cycle of $(2^N-1)$ counts it is necessary to select both the proper logic function and the counter stages whose output signals are to be logically combined. With regard to the logic function, either the Exclusive-OR or its negation, the Material Equivalence circuit may be employed. The table of Fig. 3, based on a mathematical analysis of the counter circuit, indicates which of the stages in an N stage counter may be combined in the logic circuit to give a complete count. The table assumes that the last stage of the counter is fed to one input of the logic circuit, thereby leaving only one other input of the logic circuit to be accounted for. For example, in a 4-stage counter of the type shown in Fig. 1, the table of Fig. 3 indicates that an output from either the first or the third stage may be fed to one input of the logic circuit in order to obtain a full count. If an output from the second stage in a 4-stage counter is fed to the logic circuit, the counter will count for a short sub-cycle rather than the complete $2^N-1$ cycle.

From the foregoing description of the invention it is evident that the instant counter provides a versatile, efficient and economical circuit having general utility in a variety of applications.

It must be understood that while a preferred embodiment of a shift code counter has been shown in Fig. 1, this embodiment is meant to be illustrative only, and is not limitative of the invention. The shift register 25 is a conventional type utilizing two storage elements per bit of binary information. To effect an even greater saving in the number of magnetic elements required, a shift register employing less than two storage elements per bit, such as the conventional one storage element per bit register, may be employed.

Many modifications will be suggested to those skilled in the art, and all such variations as are in accordance with the principles discussed previously are meant to fall within the scope of the appended claims.

I claim:

1. An electronic counter comprising a serial shift register having a plurality of storage elements adapted to receive and store bits of information representative of a binary number, a logical circuit coupled to said shift register and forming therewith a closed loop, said binary number being circulated in said loop in response to a plurality of advance pulses applied to said shift register elements and to said logical circuit, said logical circuit being adapted to receive bits of binary information from at least two of said shift register storage elements, said binary number being cycled in sequences of non-consecutive values by said logical circuit in response to said advance pulses, the value of said binary number at any time being a function of the original value of the binary number preset in said shift register elements and the total number of advance pulses which have occurred since said presetting, means coupled to said shift register storage elements for sensing the presence therein of a binary number having a predetermined value, and means for generating an output pulse indicative of the occurrence of the number of advance pulses required to cycle said binary number from its preset value of said predetermined value.

2. An electronic counter comprising in combination a serial shift register having a plurality of magnetic elements each capable of assuming bistable states of magnetic remanence, said magnetic elements being adapted to receive and store a binary number, a logical circuit comprising a plurality of magnetic elements each having a substantially square-loop hysteresis characteristic, said logical circuit having at least one magnetic element in common with said shift register elements and forming with said shift register a closed loop, said binary number being circulated in said loop in response to a plurality of successive advance pulses applied to both said shift register and said logical circuit elements, said logical circuit being adapted to receive bits of said binary number from at least two of said shift register elements, said binary number being unconditionally altered in sequences of non-consecutive values by said logical circuit in response to said advance pulses, the value of the binary number at any specified time being dependent upon the original value of the binary number preset in said shift register and the number of advance pulses which have occurred since said presetting, means coupled to said shift register magnetic elements for sensing the occurrence of a binary number having a predetermined value, and means for producing an output pulse indicative of the occurrence of the last of a fixed number of advance pulses required to alter said binary number from its original value to said predetermined value.

3. An electronic counter comprising a serial shift register having a plurality of magnetic cores each having bistable states of magnetic remanence and adapted to receive and store bits of information representative of a binary number, a logic circuit comprising first and second input cores and first and second output cores each capable of assuming bistable states of magnetic remanence, said logic circuit being coupled to said shift register and forming therewith a closed loop, said binary number being circulated in said loop in response to a plurality of successive advance current pulses applied to both said shift register and said logic circuit cores, said first and second logic input cores being adapted to receive bits of binary information from two of said shift register cores, an interrogation winding coupled to each of said logic circuit cores, a pair of input windings coupled to each of said output cores, the interrogation winding on each of said input cores being coupled in series to one of said input windings on each of said output cores in one of two parallel current paths, means for simultaneously transmitting an interrogating current in the same direction through said two paths to apply switching current to each of said input cores, the simultaneous switching of neither or both of said input cores by said interrogating current resulting in equal currents flowing in said parallel paths, the original magnetic remanent state of said output cores remaining unchanged in the presence of said equal currents, the switching of either of said input cores, but not both, in response to said interrogating current resulting in a diminution of current flow in the path in which said switching input core is situated and an increase in current in the other of said paths, such unequal currents flowing through said input windings coupled to said output cores resulting in the switching of either said first or second output cores in response to the respective switching of either said first or second input cores, means for reading out the information stored in said output cores, an output winding coupled to each of said output cores, means coupling said output winding on each of said first and second output cores to a first of said shift register cores whereby the information derived from the switching of either said first or second output cores by said readout means is transferred to said first shift register core, said binary number circulating in said loop being altered by said logical circuit in sequences of non-consecutive values in response to said advance pulses, the value of said binary number at any specified time being a function of the original value of the binary number preset in said shift register cores and the total number of advance pulses which have occurred since said presetting, means coupled to said shift register and logic circuit magnetic cores for sensing the presence of a predetermined binary number in said loop, and means for generating an output pulse indicative of the occurrence of the number of advance pulses required to cause said logic circuit to alter said binary number from its original value to said predetermined value.

4. A counter circuit as defined in claim 3, wherein said first input and output cores are common to both said logic circuit and said serial shift register.

5. An electronic shift code counter comprising a serial shift register having a plurality of magnetic elements each having bistable states of magnetic remanence and adapted to receive and store a binary number in the form of 1's and 0's, a logic circuit comprising a plurality of magnetic elements each having a substantially square-loop hysteresis characteristic, said logic circuit having at least one magnetic element in common with said shift register elements and forming with said shift register a closed loop, said binary number being circulated in said loop in response to successive advance pulses applied to both said shift register and said logic circuit elements, said logic circuit being adapted to receive bits of said binary number from at least two of said shift register elements, said binary number being unconditionally altered in sequences of non-consecutive values by said logical circuit in response to said advance pulses, the value of the binary number circulating in said loop at any time being dependent upon the original value of the binary number preset in said shift register and the number of advance pulses which have occurred since said presetting, sensing means for determining when said original binary number has been altered to a pattern consisting of a binary "1" in a first of said shift register elements and binary "0's" in each of the other of said plurality of shift register elements, said sensing means comprising first and second input magnetic elements and an output magnetic element each capable of assuming bistable states of magnetic remanence, an input winding and an interrogating winding coupled to each of said input elements, said first input element being switched to a preselected stable state in response to the switching of said first shift register element from the "1" state to the "0" state, means coupling said input winding of said second input element to a plurality of said shift register and logic circuit elements, the transfer of a binary "1" from one of said latter magnetic elements to another producing current flow in said input winding of said second input element whereby said latter element is switched to the same remanent state as said preselected state of said first input element, the transfer of a binary number of zero value in said shift register and logic circuit producing no current flow through said input winding on said second input element; two input windings, an interrogation winding and an output winding coupled to said output element, the interrogation winding on said input elements being coupled in series to one of said windings on said output element in one of two parallel paths, means for simultaneously transmitting interrogating current in the same direction through said current paths to apply switching current to each of said input elements, said input windings being coupled to said output element in such polarity that said interrogating current flowing respectively therethrough tends to establish opposite states of magnetic remanence in said output element, the switching of both said input elements by said interrogating current resulting in equal currents flowing in said parallel paths and allowing said output element to remain in its original stable state, the exclusive switching of said first input element from its preselected stable state to its other stable state by said interrogating current resulting in a diminution of current flow in one of said parallel paths and an increase in current in the other of said paths, such inequality of currents flowing through said input windings on said output core resulting in the switching of said latter element from its original stable state to its opposite stable state, means including said interrogation winding on said output element for sensing the magnetic state of said latter element, the switching of said output element from said opposite stable state to its original stable state generating an output pulse in said output winding coupled thereto, said output pulse being indicative of the occurrence of a number of advance pulses required to alter said binary number from its preset value to said "all '0' but one" pattern.

6. A shift code counter as defined in claim 5 wherein said logic circuit comprises first and second input elements and first and second output elements each capable of assuming bistable states of magnetic remanence, said first and second input logic elements being adapted to receive bits of binary information from two of said shift register magnetic elements, an interrogation winding coupled to each of said logic circuit elements, a pair of input windings coupled to each of said logic output elements, the interrogation winding on each of said logic input elements being coupled in series to one of said input windings on each of said logic output elements in one of two parallel current paths, means for simultaneously transmitting interrogating current in the same direction through said two paths to apply switching current to each of said logic input elements, the switching of either of said logic input elements, but not both, in response to the interrogating current applied thereto resulting in a diminution of current flow in the path in which said switching logic input element is situated and an increase in current in the other of said paths, such unequal currents flowing through said input windings coupled to said logic output elements resulting in the switching of either said first or second logic output element in response to the respective switching of either said first or second logic input element, means including said interrogation windings on said logic output elements, an output winding coupled to each of said logic output elements, means coupling said output winding on said first logic output element to a first of said shift register elements whereby the binary information derived from said first logic output element by said read-out means is transferred to said first shift register element, and means coupling said output winding on said second logic output element to said first shift register element and also to said second logic input element whereby the information derived from the switching of said second logic output element by said read-out means is simultaneously transferred to both said first shift register element and to said second logic input element, and means coupling said output winding on each of said first and second logic output elements to a first of said shift register elements whereby the binary information derived from said first or second logic output elements by said read-out means is transferred to said first shift register element.

No references cited.